US012741398B2

(12) United States Patent
Buchholz et al.

(10) Patent No.: US 12,741,398 B2
(45) Date of Patent: Sep. 22, 2026

(54) UNDERWATER PELLETIZER

(71) Applicant: Maag Germany GmbH, Großostheim (DE)

(72) Inventors: Dominik Buchholz, Straelen (DE); Michael Eloo, Xanten (DE); Patrick Sladky, Geldern (DE); Jürgen Veltel, Kevelaer (DE); Michael A. Fridley, Troutville, VA (US)

(73) Assignee: Maag Germany GmbH, Grossostheim (DE)

( * ) Notice: Subject to any disclaimer, the term of this patent is extended or adjusted under 35 U.S.C. 154(b) by 297 days.

(21) Appl. No.: 18/218,213

(22) Filed: Jul. 5, 2023

(65) Prior Publication Data

US 2024/0009892 A1 Jan. 11, 2024

(30) Foreign Application Priority Data

Jul. 7, 2022 (DE) .................... 10 2022 117 007.1

(51) Int. Cl.
*B29B 9/06* (2006.01)
*B29C 48/00* (2019.01)
(Continued)

(52) U.S. Cl.
CPC .......... *B29B 9/065* (2013.01); *B29C 48/0022* (2019.02); *B29C 48/345* (2019.02); *B29C 48/919* (2019.02)

(58) Field of Classification Search
CPC ...................................................... B29B 9/065
See application file for complete search history.

(56) References Cited

U.S. PATENT DOCUMENTS 6,551,087 B1 * 4/2003 Martin .................... B29C 48/92 425/315
6,832,738 B2 12/2004 Wessling
(Continued)

FOREIGN PATENT DOCUMENTS

DE 23 28 019 A 12/1974
DE 101 37 525 A1 2/2003
(Continued)

OTHER PUBLICATIONS

English Translation for DE 10 2013 018 239 (Year: 2015).*
(Continued)

*Primary Examiner* — Seyed Masoud Malekzadeh
(74) *Attorney, Agent, or Firm* — Troutman Pepper Locke LLP; Ryan A. Schneider; Nicholas Doss

(57) ABSTRACT

An underwater pelletizer including a die plate, a cutting chamber housing having a cutting chamber and a rotatably drivable cutter head, which is arranged in the cutting chamber for dividing melt strands output from the die plate into pellets. The cutting chamber is flushed through by process water which can be introduced through at least one inlet into the cutting chamber and, together with the cut pellets, can be discharged from the cutting chamber via an outlet. A plurality of flow channels and/or chambers are provided in the cutting chamber housing for generating different process water streams, which include at least one co-rotating flow path passing through at least one cutter head channel through the rotating cutter head, as well as at least one flow path which does not co-rotate and which leads from a fixed inlet into the cutting chamber.

30 Claims, 8 Drawing Sheets

Figure 1:
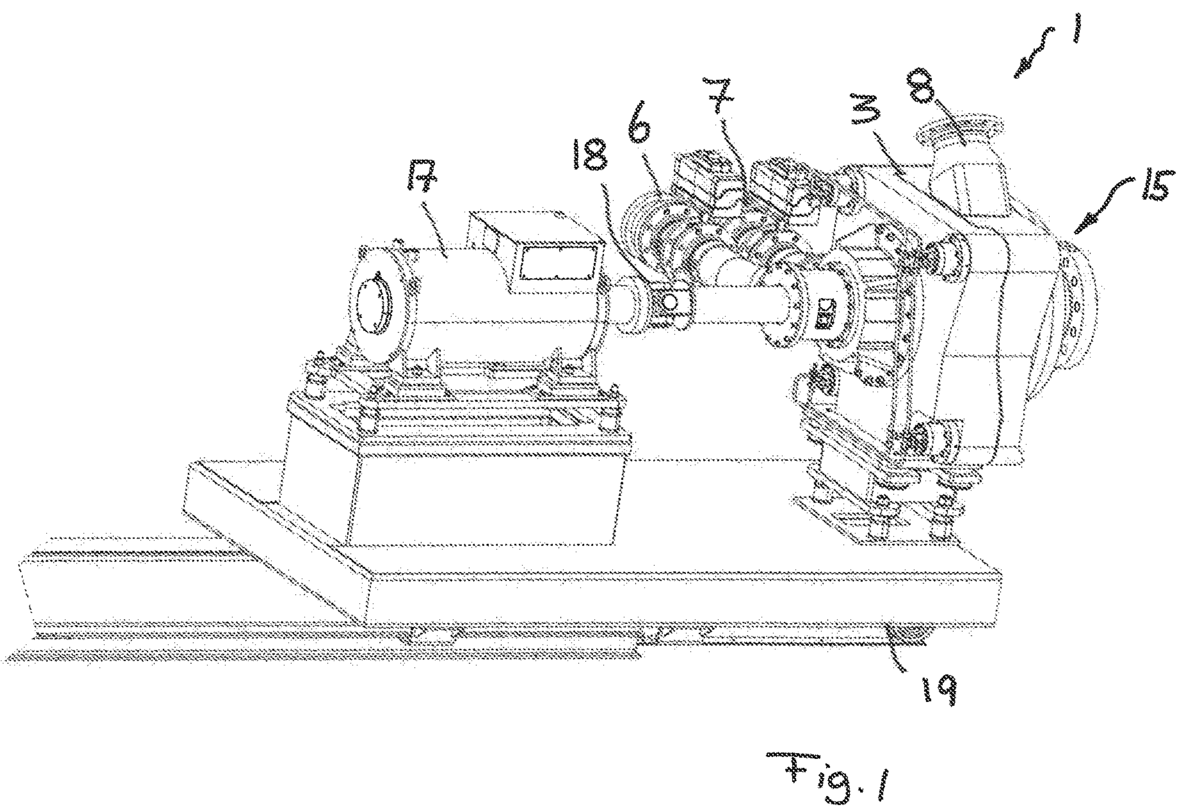

(51) Int. Cl.

| | |
|---|---|
| ***B29C 48/345*** | (2019.01) |
| ***B29C 48/88*** | (2019.01) |

(56) References Cited

U.S. PATENT DOCUMENTS

| | | | | |
|---|---|---|---|---|
| 7,393,484 | B2 * | 7/2008 | Martin | B29C 48/345 264/141 |
| 10,213,941 | B2 * | 2/2019 | Sommer | B29C 48/04 |
| 2004/0081716 | A1 * | 4/2004 | Eloo | B29B 9/065 425/313 |
| 2010/0187707 | A1 | 7/2010 | Muerb | |
| 2016/0243729 | A1 | 8/2016 | Sommer | |
| 2022/0332017 | A1 * | 10/2022 | Freese | B29C 48/05 |

FOREIGN PATENT DOCUMENTS

| | | | |
|---|---|---|---|
| DE | 10 2012 011 984 | A1 | 12/2013 |
| DE | 102013018239 | A1 | 4/2015 |
| DE | 102013020316 | A1 | 6/2015 |
| EP | 0432427 | A1 | 6/1991 |
| EP | 3062978 | B1 | 9/2016 |
| GB | 1454288 | A | 11/1976 |
| JP | H01-108706 | U | 7/1989 |
| JP | H05-293799 | | 11/1993 |
| JP | H06-043061 | B | 6/1994 |
| KR | 10-2004-0027885 | A | 4/2004 |
| WO | 2015062724 | A1 | 5/2015 |
| WO | 2019/063123 | A1 | 4/2019 |

OTHER PUBLICATIONS

English Translation for DE 10 2013 020 316 (Year: 2015).*

Office Action from Taiwanese Application No. 112123866 dated Mar. 14, 2024 (w/English Translation).

Search Report from EP Application No. 23181611 dated Nov. 7, 2023.

Office Action from Japanese Application No. JP2023-110245 dated Oct. 22, 2024 (w/English Translation).

Search Report from German Application No. 10 2022 117 007.1 dated Nov. 23, 2022.

Office Action dated Jul. 21, 2025 issued in Korean Application No. 10-2023-0088367. (22 Pages).

Office Action dated Feb. 14, 2026 issued in Chinese Application No. 202310829669.0. (10 Pages).

* cited by examiner non-co-rotating flow path(s)

10
A
8
4
C
B
S
5

8
13
10
4
3
S
5

5
S
8
4

5
8
31
4

UNDERWATER PELLETIZER

The present invention relates to an underwater pelletizer for pelletizing molten materials such as polymer melts, comprising a die plate, a cutting chamber housing comprising a cutting chamber, and a rotatably drivable cutter head arranged in the cutting chamber for dividing melt strands output from the die plate, into pellets, wherein the cutting chamber can be flushed through by a process liquid which can be introduced into the cutting chamber through at least one inlet and can be discharged from the cutting chamber together with the pellets via an outlet, wherein a plurality of flow channels for generating different process liquid flows are provided in the cutting chamber housing, comprising a co-rotating flow path which passes through at least one cutter head channel in the cutter head and at least one flow path into the cutting chamber which does not co-rotate with the cutter head.

During underwater pelletizing, the cutter head with the blades or knock-off plates attached thereto for dividing or knocking off the melt strands output from the holes of the die plate operates in a cutting chamber, which is bounded by a cutting chamber housing and flushed by process water, so that the cutter head is operated "under water" and the melt strands are pelletized in the water bath. This not only facilitates the discharge of the pellets, which are carried away by the process water exiting the cutting chamber and conveyed away in the form of a water-pellet mixture, but above all also prevents the cut pellets from sticking or caking to plant surfaces, since the temperature-controlled process water quenches or cools the usually hotter plastic strands output from the die plate or the cut pellets on the surface, thus reducing stickiness.

It should be clarified in this context that process water does not have to be pure water, but is to be understood in the sense of a process liquid, which can contain water, but also other liquids or consist of other liquids, whereby water with additives is often used as process liquid.

In addition to the desired reduction of the tendency to sticking, the flushing of the cutting chamber with process water must also perform or support other tasks and also avoid negative effects. For example, in certain applications the pellets should not be cooled down too much in order to have sufficient residual heat in the pellets, which can, for example, cause or support subsequent crystallization. In addition to suitable temperature control of the process water, the aim is to achieve a short residence time of the pellets in the process water, which in itself goes hand in hand with rapid removal of the cut pellets from the cutting chamber.

For pelletizers with high throughput, the issue of removing the cut pellets from the cutting chamber is exacerbated. In large-scale industrial plants, the throughput of the melt through the die plate and thus the throughput of the cut pellets through the cutting chamber can be orders of magnitude greater than $20^{t/h}$ or greater than $30^{t/h}$ or even greater than $40^{t/h}$. In order to be able to discharge such large quantities of pellets from the cutting chamber, efficient flushing of the cutting chamber with process water is necessary in order to avoid as far as possible accumulations of pellets in dead flow angles or swirls, which in the worst case could lead to clogging of the cutting chamber.

An area susceptible to such pellet accumulations is sometimes the central frontal gap between the cutter head and the die plate. Usually, the die plate holes are arranged in an annular area around the die plate or cutter head center, in which the blades or knocking-off plates of the cutter head sweep over the die plate at a certain cutting speed to cut or knock off the strands emerging from the die plate holes in the desired manner. Pellets may accumulate within the annular area swept by the blades if the process water does not consistently flush this area.

In addition to the above-mentioned rinsing effect, the process water is also intended to cool, in particular in the above-mentioned annular area in which the cutting blades sweep over the die plate bores, in order to cool or superficially quench, on the one hand, the melt material emerging there and to be cut, and also to cool the cutting blades and the die plate.

In order to meet the sometimes conflicting requirements for process water routing in the cutting chamber, it has already been suggested that the process water be fed into the cutting chamber along specific flow paths and that the discharge also be arranged in a specific orientation in order to facilitate the discharge of the granulate-process water mixture. For example, it has already been suggested that the inlet through which the process water is fed into the cutting chamber and the outlet through which the process water exits the cutting chamber together with the pellets should be arranged tangentially to the usually cylindrical outer surface of the cutting chamber housing, so that the process water obtains a spiral flow or a flow following the outer surface of the housing through the cutting chamber when it is flushed through the generally cylindrical cutting chamber. For example, WO 2019/063123 A1 suggests arranging the inlets and outlets for the process water on the top of the cutting chamber housing at a distance from one another in the axial direction and, if necessary, at a tangential angle in order to achieve a spiral-shaped flushing of the cutting chamber. At the same time, the arrangement of the inlets and outlets on the upper side of the cutting chamber housing can allow the cutting chamber housing to be opened by means of a bottom cover in order to have access to the cutter head, for example for maintenance or cleaning of the cutting chamber, after removal of the bottom housing cover.

Furthermore, it has also already been proposed to introduce the process water into the cutting chamber via several, separate inlets or flow paths in order to be able to control different process water rinsing requirements individually in a targeted manner. For example, EP 30 62 978 B1 proposes to supply a part of the process water via a first flow path coaxial to the drive axis of the cutter head and to flush it frontally through flow channels in the cutter head onto a central area of the die plate, whereby the flow path in the area of the flow channels rotates through the cutter head together with the cutter head. This part of the process water is primarily intended to cool the melt strands during the knocking-off. Another part of the process water is introduced into the cutting chamber from the outer circumference of the cutting chamber housing via a second process water inlet, whereby this circumferentially introduced process water flow primarily serves to flush and entrain the pellets to the opposite outlet for the process water-granulate mixture. The two process water flows can be controlled individually from each other in terms of quantity, in order to be able to influence the cooling effect when cutting up the pellets on the one hand and the rinsing effect through the cutting chamber on the other.

However, such multi-path flow control systems sometimes require complex cutting chamber housing structures that compromise the ease of maintenance and cleaning of the cutting chamber. In particular, it is often difficult to open the cutting chamber housing in such multi-path flow systems to gain access to the cutting blade or the inside of the cutting chamber. On the other hand, the flushing effect has not yet been optimally solved, since the central area between the cutter head and die plate in particular tends to accumulate pellets inside the rotating blades.

It is therefore the underlying object of the present invention to provide an improved underwater pelletizer of the type mentioned, which avoids disadvantages of the prior art and develops the latter in an advantageous manner. In particular, even with high pellet throughputs through the cutting chamber, a stick-free cut of the melt strands into pellets, a reliable, residue-free removal of the pellets from the cutting chamber and a short residence time of the pellets in the cutting chamber are to be achieved by clever flushing of the cutting chamber with process water in order to enable desired post-treatment steps with remaining residual heat.

According to the invention, the task is solved by an underwater pelletizer according to claim 1. Preferred embodiments of the invention are the subject matter of the dependent claims.

It is thus proposed to feed the process water via at least two inlets from the end face of the cutting chamber opposite the die plate, one of the frontal inlets feeding fresh process water onto the cutter head and its at least one cutting blade channel, and to that extent serving the co-rotating flow path, while another of the frontal inlets leads directly without bypass over the cutter head into the cutting chamber and feeds the stationary flow path which does not co-rotate with the cutter head and which is directed outside the cutter head frontally onto the die plate. According to the invention, at least one annular, fixed distribution chamber is provided in the cutting chamber housing, which has an outlet port arranged on the end face of the cutting chamber opposite the die plate, which outlet port opens directly into the cutting chamber frontally to the die plate.

The feed stream guided by the rotating cutter head and thus rotating with it, and the feed stream not guided by the rotating blade, flowing from a fixed outlet into the cutting chamber and thus not rotating with it, complement each other and flush the cut pellets away from the die plate, wherein the rotating feed stream and the non-co-rotating feed stream are both directed towards the die plate from the opposite cutting chamber end face, but encounter there different areas. While the co-rotating feed stream is directed more centrally and in particular within the annular area swept by the blades onto the die plate, the non-co-rotating feed stream or the feed stream coming from the fixed outlet can be directed less centrally or further outside and in particular outside past the cutter head and/or in the area of the rotating blades onto the die plate. The fixed outlet port, which serves the non-co-rotating flow path, can in particular be arranged radially outside the diameter area of the cutter head and/or be spaced from the cutter head and/or aligned with it in such a way that the process water flow exiting from the outlet port does not meet the cutter head on the end face and passes through the cutter head channels provided there, but flows laterally or circumferentially past the cutter head and meets a die plate annular area located radially outside the diameter area of the cutter head and possibly also meets blades projecting radially from the cutter head body. circumferentially past the cutter head and meets a die plate annular area located radially outside the diameter area of the cutter head and possibly also meets blades projecting radially from the cutter head body.

In a further development of the invention, the outlet port of the annular, fixed distribution chamber, which opens directly into the cutting chamber, can be arranged at a greater distance from the axis of rotation of the cutter head than the outlet port of the at least one co-rotating cutter head channel leading through the cutter head.

Further, the outlet port directly into the cutting chamber may also be spaced axially, i. e; in a direction perpendicular to the die plate, further from the die plate than an outlet port of the inlet serving the co-rotating flow path through the cutter head. In particular, the inner inlet port serving the co-rotating flow path can end or be positioned directly at a rear side of the cutter head or of the cutter support of the cutter head, if necessary separated from the rear side of the cutter head by a small gap, while the other outlet port serving the non-co-rotating flow path is spaced significantly further from the die plate and also from the rear side of the cutter head, for example by a distance corresponding to at least twice the height of the cutting blades. The axial distance of the outer inlet orifice serving the non-rotating flow path from the rear face of the orifice plate may be more than twice as great, or more than three times as great, or more than five times as great as the distance that the inlet orifice of the rotating flow path is from the rear face of the orifice plate.

The at least one outlet port of the annular distribution chamber leading directly into the cutting chamber can be slot-shaped in the manner of an oblong hole, for example be kidney-shaped and/or extend, for example, arcuately around the axis of rotation of the cutter head in order to be able to supply fresh process water to the cutting chamber distributed over a larger sector. For example, the outlet port can extend in the form of a slit over a sector of more than 900 or more than 1200 or even more than 180°, in particular on a side of the cutting chamber opposite the outlet port, in order to be able to feed fresh process water to the cutting chamber in a correspondingly large sector, which then entrains pellets cut up in the cutting chamber and transports them to the outlet port. If necessary, the outlet port of the annular distribution chamber can also extend annularly completely around the axis of rotation of the cutter head, for example in the form of a circular outlet slot in the end wall of the cutting chamber opposite the die plate.

Alternatively, or additionally to such an elongated hole-shaped or slot-shaped or annular outlet ports, the annular distribution chamber may also have several outlet ports spaced apart from each other, which may be arranged in the end face of the cutting chamber opposite the die plate and directed frontally towards the die plate. In this context, frontally aligned with the die plate can mean that the longitudinal axis of the outlet port and thus the direction of flow of the process fluid entering the cutting chamber is actually perpendicular to the die plate, although outlet ports that are set at a more or less oblique angle to the cutting surface of the die plate, for example at an angle of 850 to 950 or 800 to 1000 or 700 to 110°, can still be described as frontally aligned with the die plate.

The at least one outlet port of the annular distribution chamber, which leads directly into the cutting chamber, can in particular specify a flow direction for the process water entering the cutting chamber, which is aligned at least approximately parallel to the axis of rotation of the cutter head.

As an alternative to an exactly axial introduction of the directly rinsing process water, however, the process water can also advantageously be directed into the cutting chamber with a twist and/or with a movement component inclined in the circumferential direction, in particular in such a way that the process water rotates or bolts in the direction of rotation of the cutter head, i.e., in addition to the axial component it also executes a movement component in the circumferential direction with a direction of rotation corresponding to the cutter head rotation. This can be achieved, for example, by eccentrically introducing the process water into a corresponding distribution chamber. In particular, an inlet for the process water of the non-rotating water supply can be placed tangentially to the inlet chamber so that the direction of flow in the inlet chamber is identical to the direction of rotation of the cutter head. In the further course, the process water then flows out of the inlet chamber in an axial direction towards the die plate, so that an axial component is superimposed on the circulating movement, resulting in a swirl-like or screw-like process water flow overall. Alternatively, or additionally, however, the at least one or more outlet ports can also have correspondingly inclined mouth areas in order to introduce the process water into the cutting chamber at an acute angle to the die plate, for example.

In further development of the invention, at least two separate distribution chambers can be provided in the cutting chamber housing, one of which is the annular distribution chamber already mentioned, whose one or more outlet ports lead frontally to the die plate directly into the cutting chamber, and of which a further distribution chamber is flow-connected to the one or more co-rotating cutter head channels, for example by a supply pipe which may extend parallel adjacent to the cutter head axis of rotation or coaxial with the cutter head axis of rotation, to supply the fresh process water to the one or more cutter head channels.

The at least one cutter head channel can open at least approximately parallel to the cutter head axis of rotation and/or perpendicular to the die plate. Alternatively, however, the at least one cutter head channel can also open out at an angle to the die plate, for example in a radial plane containing the cutter head axis of rotation, opening out at an angle towards the die plate. Alternatively, or additionally, the at least one cutter head channel can also be arranged inclined in the circumferential direction, in particular in such a way that the process water exiting the cutter head channel receives a movement component in the circumferential direction corresponding to the direction of rotation of the cutter head. In principle, it is also possible to feed the process water through the cutter head to an inlet chamber via a tangential inlet channel, so that the process water in the inlet chamber performs a circumferential movement corresponding to the cutter head rotation, and the process water can then flow favorably in terms of flow through the co-rotating cutter head channel in the axial direction towards the die plate.

In further embodiments of the invention, a plurality of cutter head channels may be spaced apart from one another, and in particular may be arranged in an annular region around the cutter head axis of rotation. The annular area may be located within and/or adjacent to the blades of the cutter head so that the co-rotating flow paths direct process water into the face gap area between the die plate and cutter head within the blades of the cutter head.

In particular, the cutter head channels can open directly inside the cutting blades of the cutter head on the cutter head face facing the die plate. This allows the process water supplied via the cutter head channels to flush out pellets cut up by the blades from the face gap area between the cutter head and die plate and prevent pellets from accumulating in the central face gap area between the cutter head and die plate. In particular, the co-rotating flow paths can be used to generate a process water flow which flows parallel to the die plate out of the central region of the end face gap past the blades to the outside, thereby entraining the pellets or pellets.

In further embodiments of the invention, the two aforementioned distribution chambers may each be annular in shape and positioned on the end face of the cutting chamber opposite the die plate. Since the two distribution chambers feed different outlet ports, the two annular distribution chambers can have different diameter ranges, in particular non-overlapping diameter ranges. In particular, the two annular distribution chambers can be configured to lie inside each other, so that a distribution chamber of smaller diameter lies inside a distribution chamber of larger diameter. In particular, the annular distribution chamber feeding the cutter head channels can be arranged inside the annular distribution chamber, which has fixed outlet ports leading directly into the cutting chamber, i.e., not via the cutter head into the cutting chamber.

In further development of the invention, the annular distribution chamber, which opens directly into the cutting chamber via fixed outlet ports, can have an inlet inclined tangentially to the circumferential wall of the distribution chamber and/or inclined obliquely to the radial direction, so that the process water flowing into the annular distribution chamber forms a circulating flow in the distribution chamber or, respectively flow around in the annular distributor chamber in a spiral and/or following the circumferential wall before the process water flows into the cutting chamber via the at least one outlet port frontally towards the die plate.

In a further development of the invention, the inlet can in particular be inclined and/or tangentially positioned in such a way that the process water in the distribution chamber has a direction of rotation and/or, when entering the cutting chamber, has a flow direction with a component corresponding to the direction of rotation of the cutter head. In other words, the inlet in the distribution chamber can create a spiral flow whose direction of rotation corresponds to the direction of rotation of the cutter head.

Alternatively or additionally, in a similar manner, the annular distribution chamber that feeds the co-rotating flow path or feeds the cutter head channels may also have an inlet that is oriented tangentially to the circumferential wall and/or is arranged inclined to the radial direction in order to generate a circulating process water flow in the annular distribution chamber or to cause the process water to flow spirally around in the distribution chamber, in particular in a direction of rotation that corresponds to the direction of rotation of the cutter head. This allows the cutter head channels to be fed more efficiently.

In an advantageous further development of the invention, the flow ratio can be variably adjusted and/or controlled, for example in the form of the volume ratio and/or the pressure ratio and/or the temperature ratio of the process water streams supplied via the two separate flow paths, i.e., the process water streams feeding the co-rotating flow path on the one hand and the non-co-rotating flow path on the other hand. In particular, the flow rate and/or the pressure and/or the temperature of the process water fed to the co-rotating flow path can be individually adjusted and/or controlled independently of the process water feeding the other flow path. Alternatively, or additionally, the flow rate and/or the pressure and/or the temperature of the process water fed directly into the cutting chamber via the fixed at least one outlet can also be individually adjusted and/or controlled independently of the process water feeding the co-rotating flow section.

Alternatively, or additionally, the distribution between the two flow paths can be adjusted and/or the total volume flow can be adjusted or controlled to match each other.

According to a further aspect of the present invention, in order to make the dwell time of the pellets in the cutting chamber comparable as well as to avoid multiple recirculation of already cut pellets, the cutting chamber can be formed with a special geometry independently of the multiple flow paths for the process water. In particular, the cutting chamber can be contoured in such a way that the envelope volume defined by the cutting chamber around the cutting blades, in which the process water can spread out, so to speak, becomes larger towards the outlet when viewed in the direction of rotation of the cutter head. In particular, in a sector of the cutting chamber that the cutting blades reach immediately after passing the outlet, the envelope volume of the cutting chamber may be minimal around the blades, then progressively increase and become maximal towards the outlet.

In this case, the cutting chamber can increase in depth and/or width when viewed in the direction of rotation in the manner of a worm house when viewed in the direction of rotation, in particular starting from an area that lies immediately behind the outlet when viewed in the direction of rotation of the cutter head, towards the outlet. The depth of the cutting chamber means its extension in the axial direction or in the direction of the cutter head axis of rotation. Width here means the circumferential wall of the cutting chamber and the envelope contour of the blades of the cutting head or the cutting head itself, depending on how the blades are arranged.

In particular, along its outer circumference and thus adjacent to the cutting blades of the cutter head or adjacent to the outer circumference of the cutter head, the cutting chamber can define a tubular volume area that can increase continuously or, if necessary, also in steps from the sector of the cutting chamber that the blades reach after passing the outlet toward the outlet.

By means of a volume tube around the cutting blades that increases towards the outlet, the residence time of the pellets can be significantly equalized. In the region with the smallest gap dimension or in the sector that is located immediately after the outlet in the direction of circulation and is narrow around the cutter head, the inflowing rinsing process water has little space to spread out, so that higher pressures are generated here and thus higher flow velocities of the process water are achieved. This allows the pellets cut there to be flushed out much faster.

On the other hand, as viewed in the direction of rotation of the cutter head, more and more pellets are accumulated between or around the cutting blades as they get closer to the outlet, since on the one hand the pellets already cut further forward as viewed in the direction of rotation are transported along with them and the freshly cut pellets are added in sectors lying downstream, so to speak.

In the sectors closer to the outlet when considering the direction of circulation of the cutter head, the cutting chamber around the cutter head becomes more voluminous, so that the process water has more space and/or the pressure of the process water decreases and/or the flow velocity of the process water decreases, so that, considered as a whole, the dwell time of the pellets cut in different circulation sectors is equalized.

In order to prevent multiple or even endless circulation of cut pellets, in an advantageous further development of the invention, a flow guide plate and/or a deflector can be arranged in the cutting chamber in the area of the outlet in order to direct pellets flowing with the process water specifically into the outlet. Such a baffle and/or a shell- or panel-shaped deflector can extend in particular between the outer contour of the cutter head or the envelope contour of the cutting blades and the outlet, whereby the baffle or the deflector can extend in particular from a circumferential wall of the cutting chamber adjacent to the envelope contour of the cutter head counter to its circumferential direction into the cutting chamber, projecting from a section of the circumferential wall of the cutting chamber which, viewed in the circumferential direction of the cutter head, defines the rear edge contour towards the outlet.

For example, the baffle or deflector may extend in an arcuate curve around the envelope contour of the cutter head and project from the root region of the outlet in the manner.

In an advantageous further development, the cutting chamber housing can be designed to be separable in order to expose the cutting chamber and/or the cutter head by moving one cutting chamber housing part away from another cutting chamber housing part in order to be able to perform cleaning or maintenance work. In an advantageous further embodiment of the invention, the cutting chamber housing may thereby comprise a fixed housing portion which may be fixedly mounted to the die plate and/or fixedly connected to the die plate even when the cutting chamber housing is opened. A movable housing part or housing part to be opened can have a bearing for the cutter head and/or be supported on a cutter head drive and/or be mounted so that it can be moved away from the die plate together with the cutter head and moved towards the die plate. In particular, the movable housing part can be designed to be moved away from the die plate and the fixed housing part together with the cutter head in order to open the cutting chamber.

Independent of the assignment of the pelletizer components to the housing parts, the housing parts can be designed in such a way that the movable housing part can be moved away from the fixed housing part in a translatory linear manner or can be moved towards the fixed housing part in a translatory linear manner. In particular, the movable housing part can be moved away from the fixed housing part in the direction of the axis of rotation of the cutter head and moved toward and connected to the movable housing part. The coupling direction of the two housing parts can be aligned essentially parallel to the axis of rotation of the cutter head.

In particular, the intersection or connection point between the two housing parts that are movable relative to each other can be such that the intersection or connection point can be joined and separated by a translatory movement of the movable housing half in the direction of the axis of rotation of the cutter head.

The intersection or connection point between the two housing parts movable relative to each other can advantageously extend at least predominantly in an inclined plane, which is set at an acute angle to the cutter head axis of rotation. In this case, the entire contours of the cut or connection point do not have to be located in a common plane, but rather, for example, a U-shaped interface contour can be provided in a plane, the missing end piece of which can extend, for example, in the form of a further interface sector in a plane angled with respect thereto or can have a step-shaped jump or can also extend along a free-form surface. Considering the interface between the two housing parts as a whole, the interface, roughly speaking, may extend at least predominantly in an inclined plane.

In particular, the inclined interface plane may be closer to the die plate in a lower section than in an upper section. In other words, the interface extends from the bottom near the die plate to the top further away from the die plate.

Regardless of the specific contouring, the interface between the two housing parts that can be coupled and uncoupled can extend in the area of the cutting chamber and/or extend across the distribution chambers for the process water, so that, for example, at least one part of the annular distribution chamber for direct feeding of the cutting chamber can be formed in the retractable housing part and another part can be formed in the stationary housing part. Alternatively or additionally, the distribution chamber for feeding the co-rotating flow path can also be formed partly in one half of the housing and partly in the other housing part, whereby it can also be advantageous, alternatively, if the distribution chamber for feeding the co-rotating flow path is formed completely in one of the housing parts, in particular in the movable housing part, which can be moved away from the die plate and the housing part connected thereto together with the cutter head.

The two aforementioned fixed and movable housing parts can each form housing halves, so that the housing as a whole can be moved apart into two housing parts. In principle, however, it would also be possible to provide a three- or four-part or multi-part design and to make several movable housing parts movable away from one or more fixed housing parts.

In an advantageous further development of the invention, the outlet for the process water-granulate mixture from the cutting chamber can be associated with the housing part mounted stationarily on the die plate. Regardless, one or two or all of the inlets through which process water may be supplied to the cutting chamber may be provided on the movable housing half so as to be movable with the movable housing half away from the stationary housing half.

In particular, in further development of the invention, the outlet for the process water-granulate mixture can be arranged at an upper half of the housing, while the inlets for feeding the fresh process water into the cutting chamber can be assigned to a lower half of the housing.

Advantageously, a seal may be provided between the couplable housing parts, which may comprise, for example, an annular seal that may extend along the interface between the two housing parts. For example, an elastic O-ring can be provided between the separable housing parts to seal them water- or fluid-tight when coupled together. The seal at the interface of the two housing parts can be provided in particular to make the cutting chamber watertight, so that the process water can enter or exit the cutting chamber only at the inlets and outlets.

In order to achieve simple, rapid coupling and uncoupling with sufficient tightness of the interface, a clamping device can be provided between the two housing parts that are movable relative to each other, by means of which the two housing parts can be clamped or pressed together in the coupled state.

Such a clamping device can advantageously be designed to apply a clamping force at least approximately parallel to the axis of rotation of the cutter head and/or to clamp the two housing parts onto each other in the direction of the axis of rotation of the cutter head.

Advantageously, the clamping device can have one or more quick-action clamps, for example in the form of movable clamping levers and/or clamping cylinders that can be actuated by pressure means. Alternatively, or additionally, clamping screws can also be used.

In an advantageous further development of the invention, hydraulic clamping cylinders distributed over the circumference of the housing parts can be provided, which can cooperate with a counterpart on the opposite housing part, for example be locked, hooked, or fixed there.

Hydraulic actuation of the clamping cylinders then allows the housing parts to be clamped against each other with a positive and non-positive fit to achieve the desired seal.

Figure 2:
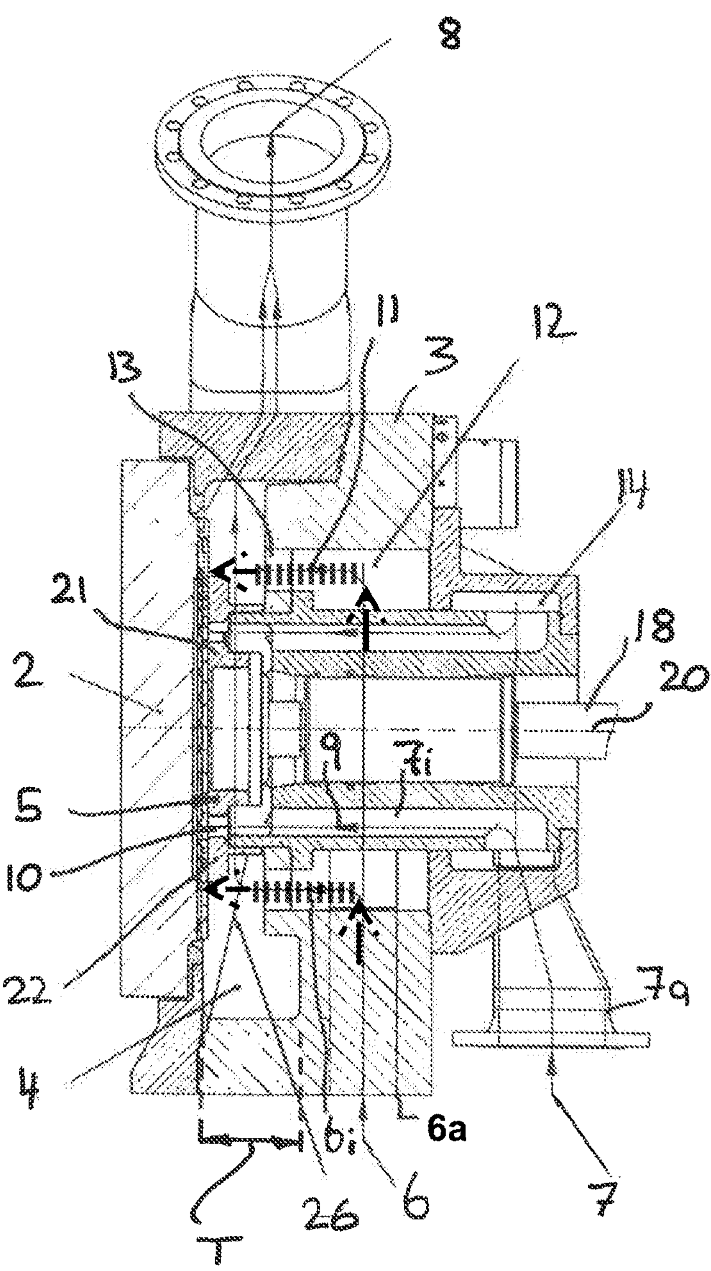
Figure 3:
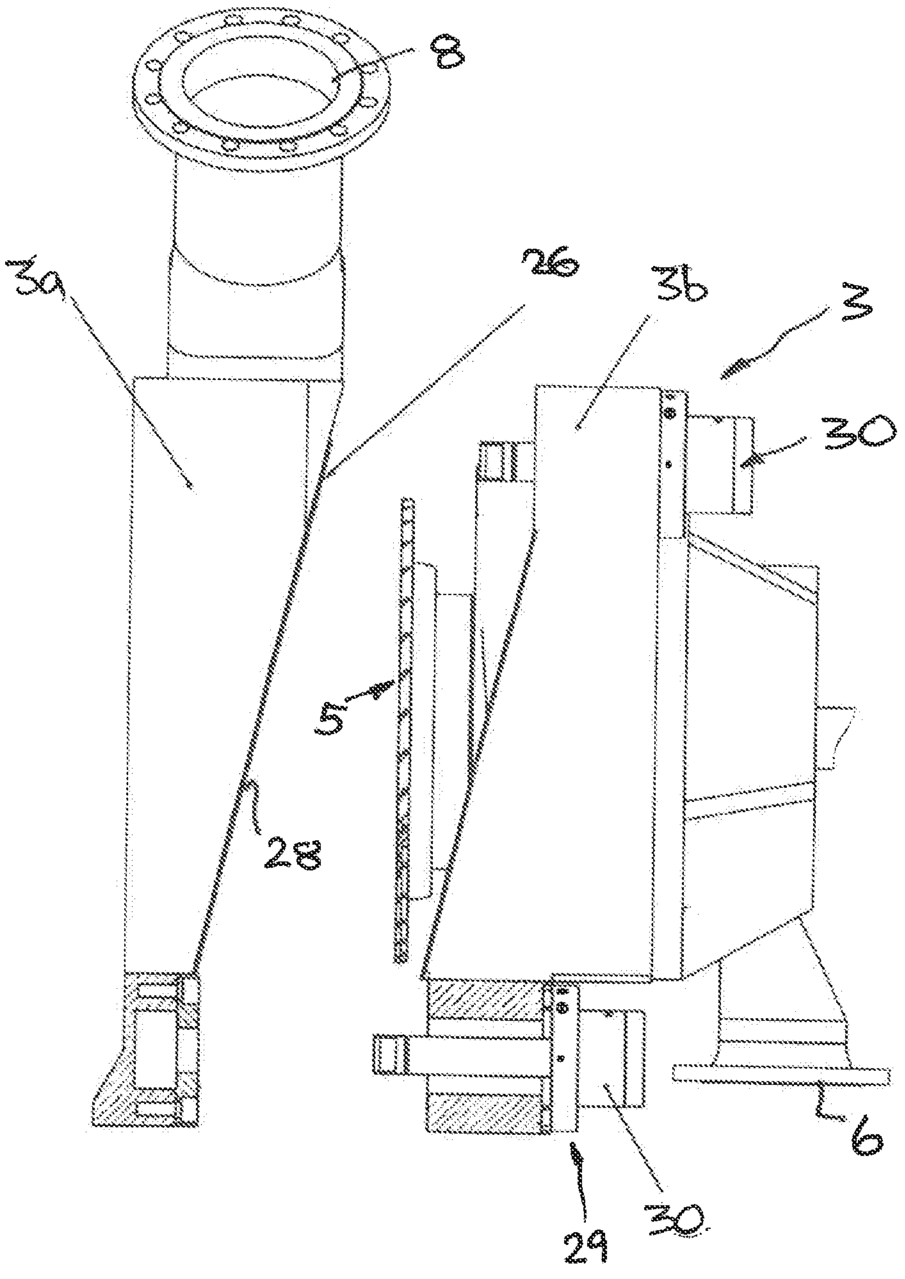
Figure 4:
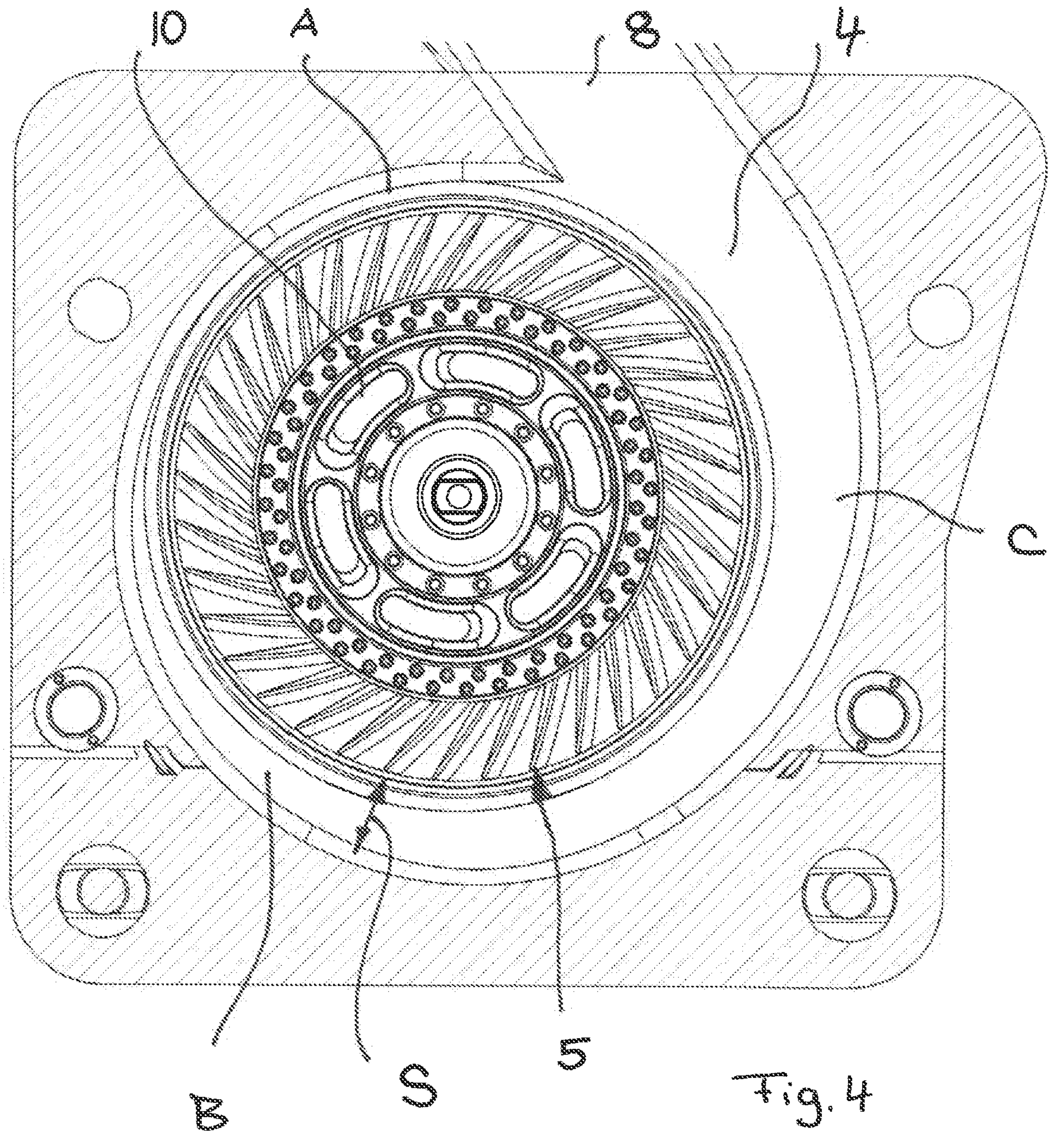
Figure 5:
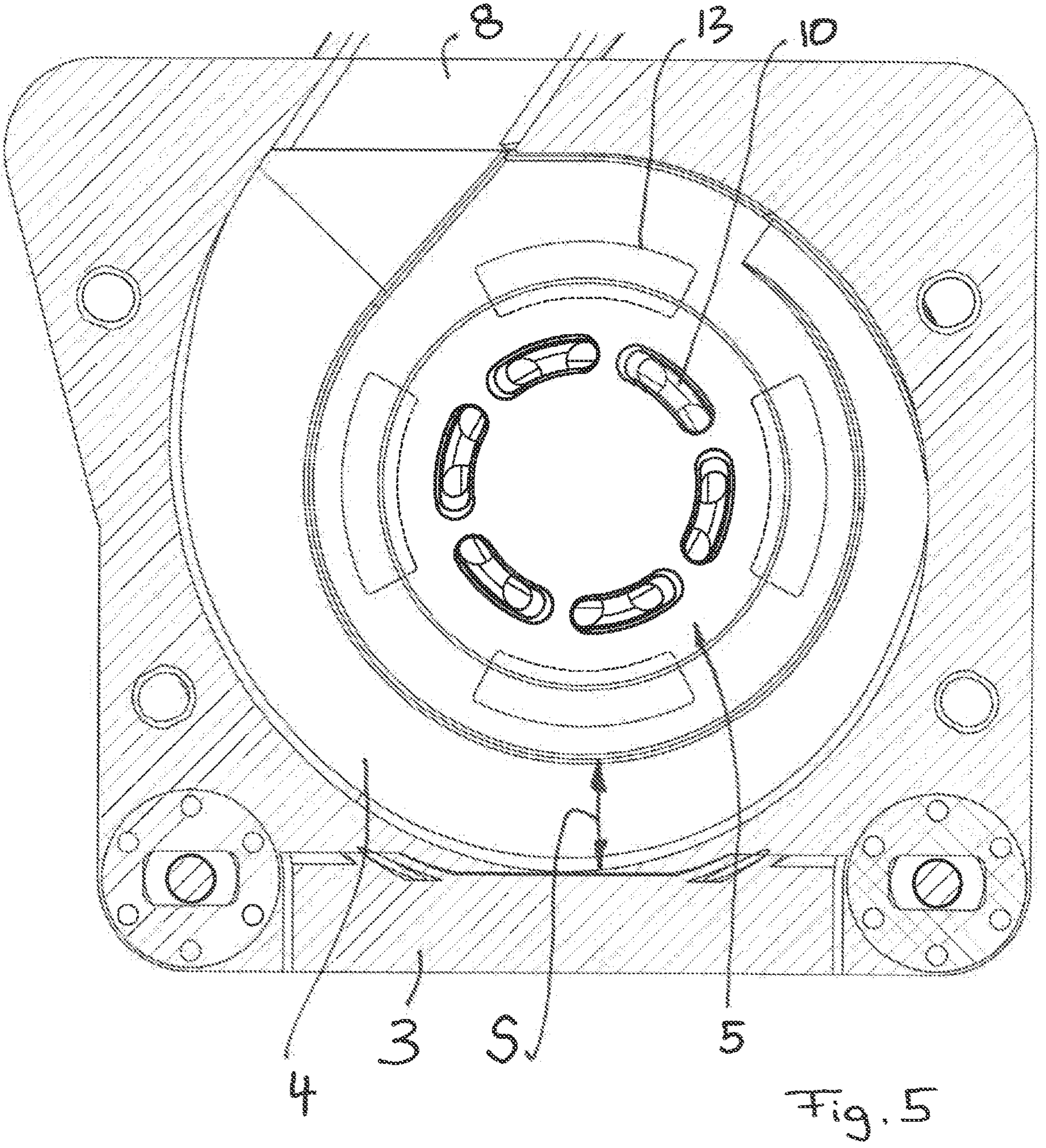
Figure 6:
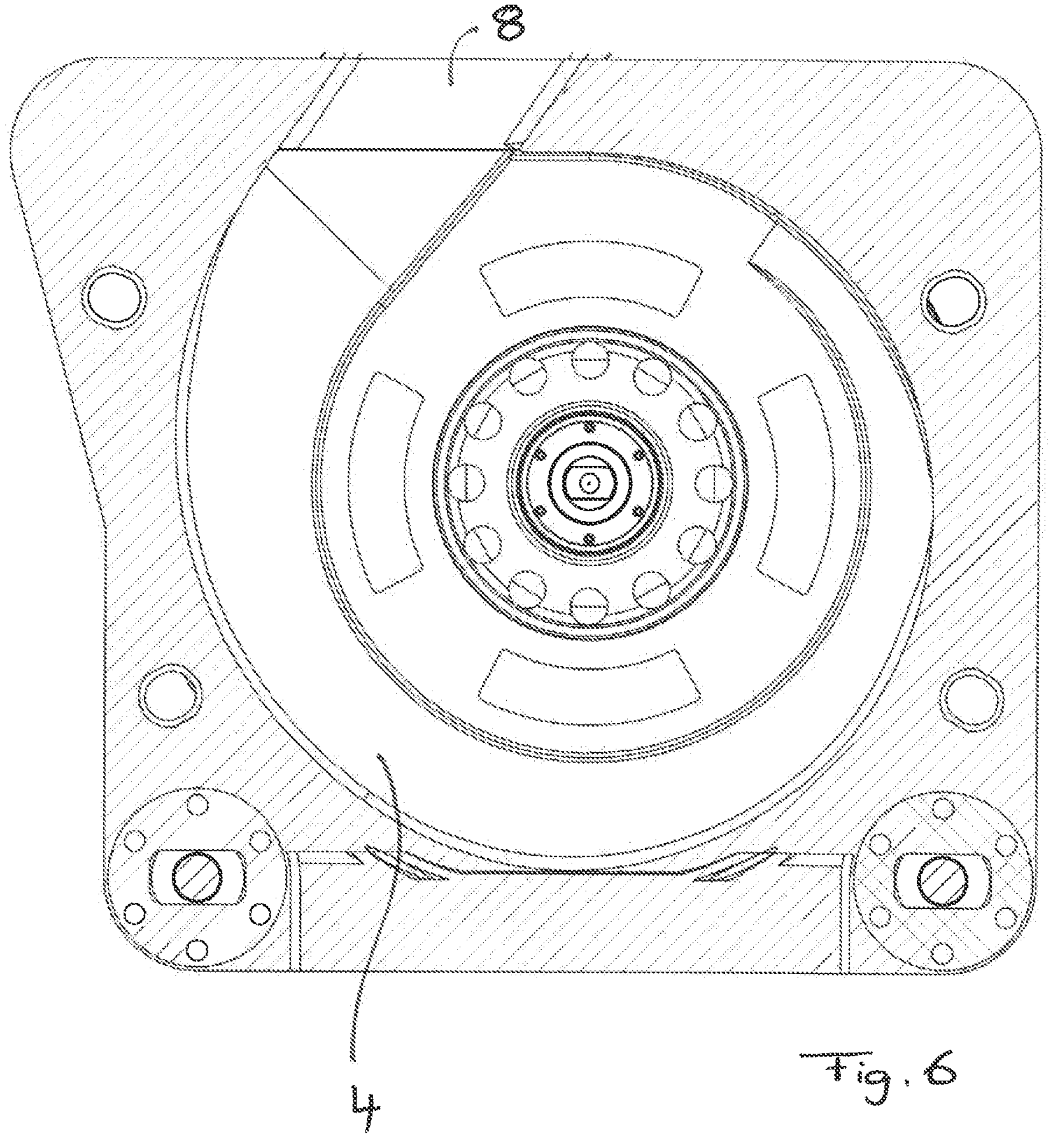
Figure 7:
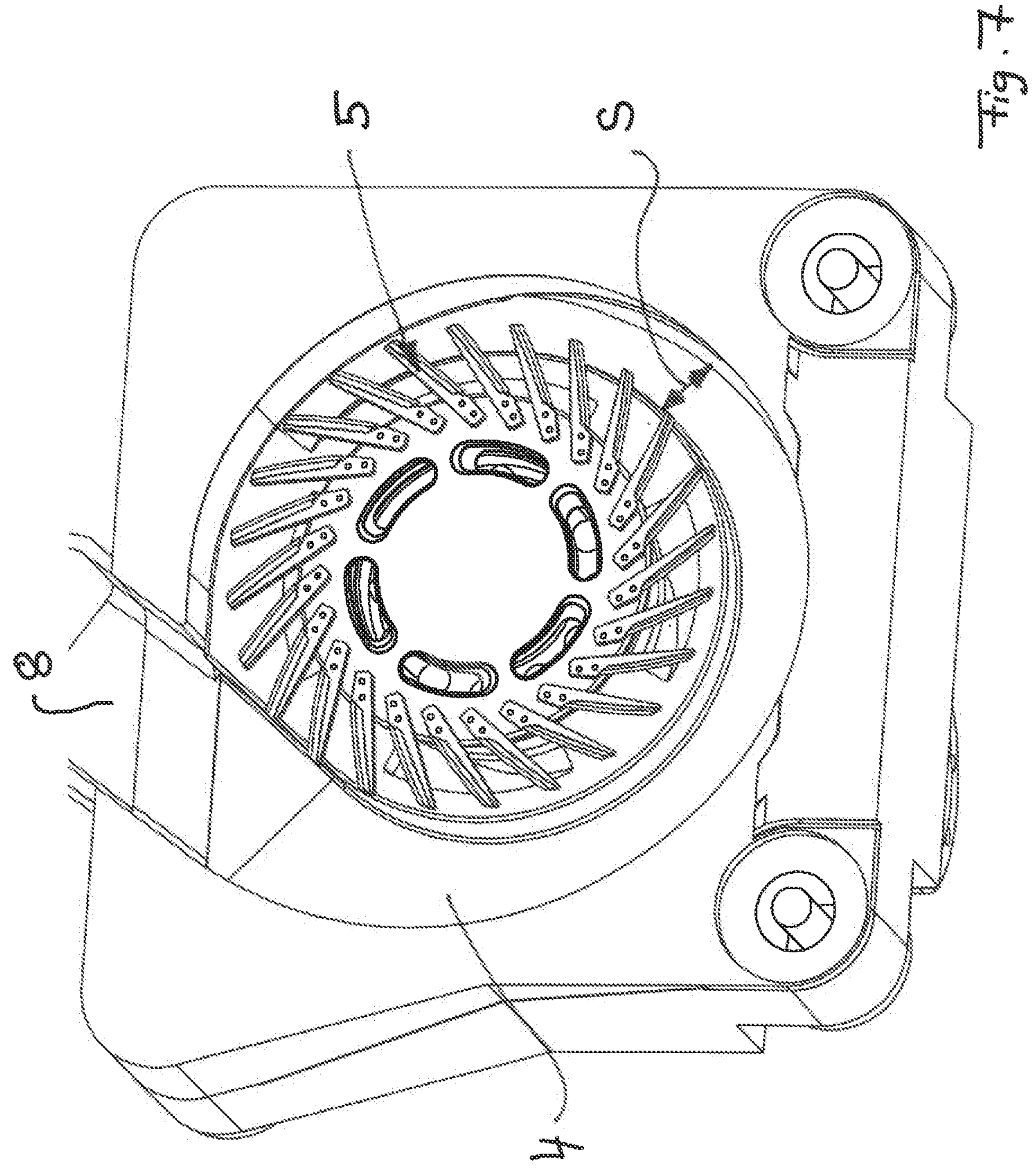
Figure 8:
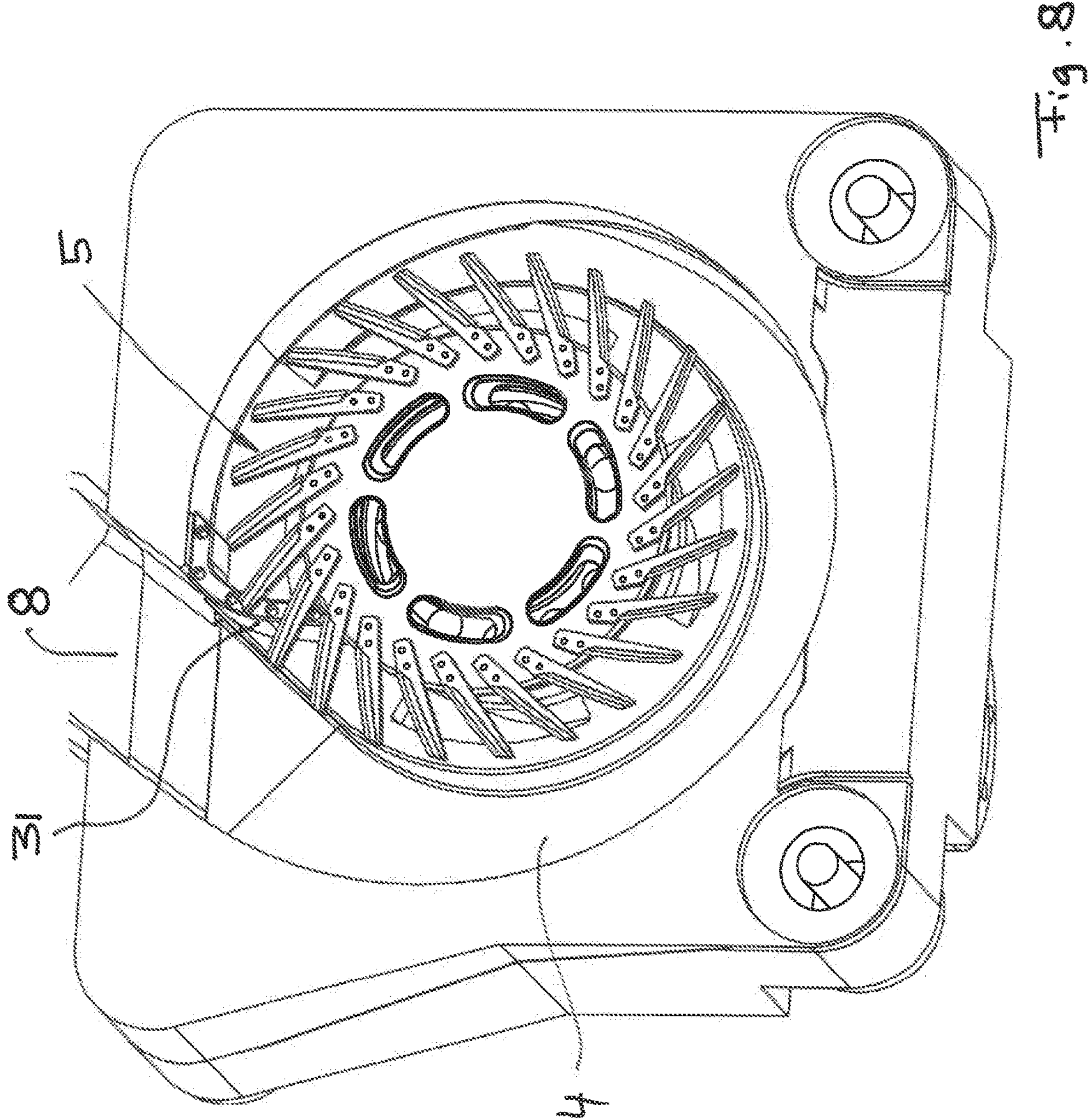

The invention is explained in more detail below with reference to a preferred embodiment and associated drawings. In the drawings show:

FIG. 1: a perspective view of an underwater pelletizer showing its cutting chamber housing, its cutter head drive device, and the process water connections of the cutting chamber housing for flushing the cutting chamber with process water;

FIG. 2: a longitudinal section through the cutting chamber housing of the underwater pelletizer of FIG. 1, showing the cutter head attached to the die plate and the flow paths of the process water for flushing the cutting chamber;

FIG. 3: a side view of the cutting chamber housing of the underwater pelletizer from the preceding figures in an opened, extended position of the two housing parts of the cutting chamber housing, showing the cutter head moved away with the movable housing part and the hydraulic clamping cylinders for connecting the two housing parts;

FIG. 4: a cross-sectional view of the cutting chamber of the underwater pelletizer shown in the preceding figures in a direction of view out of the die plate toward the cutter head, showing the mouth regions of the flow paths passing through the cutter head and the eccentric configuration of the cutting chamber around the cutter head;

FIG. 5: a sectional view of the cutting chamber of the underwater pelletizer from the previous figures in an inverted viewing direction compared to FIG. 4, so to speak, to the rear of the cutter head, showing the mouth areas of the process water outlet leading directly into the cutting chamber and the eccentric arrangement of the cutter head in the cutting chamber;

FIG. 6: a further sectional view of the cutting chamber of the underwater pelletizer similar to FIG. 5 in an axially offset sectional plane in comparison;

FIG. 7: a perspective view of the cutting chamber with the cutter head disposed therein, showing the three-dimensional contouring of the cutting chamber with the cross-sectional volumes of the cutting chamber increasing toward the outlet; and FIG. 8: a perspective view of the cutting chamber with the cutter head arranged therein similar to FIG. 7, whereby in comparison to FIG. 7 a guide plate arranged at the outlet of the cutting chamber can be seen, which prevents multiple circulation of cut pellets.

As shown in FIG. 1, the underwater pelletizer 1 comprises a melt feed head 15, which can be connected for example to a melt feed device comprising an extruder, which is not shown, the melt feed head 15 comprising or being connectable to a die plate 2, which comprises nozzle-like melt channels for forcing melt strands through the die plate or allowing them to be output from the die plate. The melt channels of the die plate may open on an end face of the die plate 2, which forms the cutting surface 23 and faces a cutter head 5, cf., FIG. 2.

The die plate 2 is thereby connected to a cutting chamber housing 3, which encloses a cutting chamber 4 adjacent to the end face of the die plate 2, which forms the cutting surface of the die plate 2. In this case, the end face of the die plate 2 delimits the cutting chamber 4 on one end face, while the cutting chamber housing 3 can delimit the cutting chamber 4 circumferentially and on an end face opposite the die plate 2.

The cutting chamber 4 accommodates a cutter head 5 which is rotationally drivable about a cutter head axis of rotation, the cutter head axis of rotation being capable of extending substantially perpendicular to the cutting surface of the die plate 2.

A cutter head drive 16 is provided for rotationally driving the cutter head 5, cf., FIG. 1, which can comprise, for example, an electric motor 17 or also a hydraulic motor, which can be connected to the cutter head 5 in a driving manner, if necessary via a gear stage and a drive shaft 18, cf., FIG. 1.

The assembly comprising the cutter head 5, the cutter head drive 16 and the cutting chamber housing 3 or at least a part of the cutting chamber housing 3 can be mounted on a bearing slide 19 so as to be movable in translation, in particular in a direction at least approximately parallel to the cutter head axis of rotation 20.

As FIG. 2 shows, the cutting chamber 4 may be at least approximately cylindrical or disc-shaped in contour when viewed as a whole, and may be seated on one side of the die plate 2 so that the cutter head 5 may be received in the cutting chamber 4.

The cutter head 5 comprises in this case a cutter support 21, on which blades 22 are arranged on the end face and/or outer circumferential side, which sweep over the die plate 22, and in particular in an annular region, in which the melt channels of the die plate 2 open out on its end-face cutting surface. This allows the blades 22 to knock off the melt strands output from the melt channels and cut them into pellets.

The cutting chamber 4 is flushed by process water, which is supplied to the cutting chamber 4 via a plurality of inlets 6, 7 and discharged together with the cut pellets in the form of a process water-pellets mixture via an outlet 8, cf., FIG. 2.

The outlet 8 may be arranged on an upper side of the cutting chamber housing 2 and lead tangentially out of the circumferential wall of the cutting chamber 4 and/or be arranged at an angle to the radial direction on the circumference of the cutting chamber 4, cf., FIG. 1 and FIG. 2.

The inclined position of the outlet 8 can be adapted to the direction of rotation of the cutter head 5 in such a way that process water flowing spirally around in the cutting chamber 4 or along the circumferential wall of the cutting chamber 4 can flow off tangentially at the circumferential side without major directional bypass or without reversal of direction.

The inlets 6, 7 for supplying the process water can be arranged on a lower side of the cutting chamber housing 3 and/or in the area of a lower half of the cutting chamber housing 3, cf., FIG. 1 and FIG. 2.

The process water is fed into the cutting chamber 4 along various flow paths via the inlets 6, 7.

As FIG. 2 shows, both inlets 6, 7 lead into the cutting chamber 4 from a rear end face, i.e., from the end face of the cutting chamber 4 opposite the die plate 2. In this case, one of the inlets 7 is arranged more centrally, i.e., closer to the axis of rotation 20 of the cutter head 5, and the other inlet 6 is arranged less centrally or more eccentrically, i.e., further away from the axis of rotation 20 of the cutter head 5.

In particular, the inlet 7 is arranged and oriented such that process water exiting the inlet 7 into the cutting chamber 4 is directed directly onto an end face of the cutter head 5. Cutter head channels 10 are formed in the cutter head 5, which open onto the end face of the cutter head 5 on the die plate side, so that the process water can flow through the cutter head 5 and flow frontally onto the die plate 2.

The cutter head channels 10 are thereby provided in an annular area or in a diameter area radially inside the diameter area in which the blades 22 are arranged, so that the process water enters the frontal gap between the die plate 2 and the cutter head 5 inside the blades 22. This creates a process water flow between the die plate 2 and the cutter head 5, which runs essentially parallel to the die plate 2 and flows at least approximately radially outward, so that pellets deposited on the blades 20 are flushed outward into the cutting chamber 4.

The inlet 7 feeds the co-rotating flow path 9 formed by the cutter head channels 10, which leads into a central region of the face gap between the die plate 2 and the cutter head 5, where it forms a flow extending from the center outward and parallel to the die plate 2 to prevent pellets from accumulating in the central region.

As FIG. 2 shows, the inlet 7 may form an annular channel extending around the drive shaft 18, in particular aligned coaxially with the cutter head axis 20.

As FIG. 2 shows, the inlet 7 on the outside of the cutting chamber housing 3 may have an inlet port **7*a* or inlet connection for connecting a process water line that opens into an annular distribution chamber 12 formed inside the cutting chamber housing 3 and communicating with the annular inlet channel 7*i* that directs the process water to the back of the cutter head 5 or feeds the cutter head channels 10**.

The other inlet 6 also includes an inlet port **6*a* or connection provided on the outside of the cutting chamber housing 3 for connecting a process water line. However, this further inlet 6 does not feed the process water through the cutter head 5, but past the cutter head 5 directly into the cutting chamber 4 and in this respect feeds a non-co-rotating flow path 11**.

In particular, the further inlet port **6*a* may first communicate with a further annular distribution chamber 12 formed inside the cutting chamber housing 3 and provided behind or adjacent to the end face of the cutting chamber 4. The annular distribution chamber 12 may be formed around the inner inlet 7 described previously, cf., FIG. 2, and may have one or more outlet ports 13 opening into the cutting chamber 4 from the end face opposite the die plate 2 and directing the process water frontally past the outer circumference of the cutter head 5 onto the die plate 2. As FIG. 2 shows, the outlet ports 13 may be arranged in a diameter range that is larger than the diameter of the blade carrier 21 of the cutter head 5 and/or larger than the diameter range in which the cutter head channels 10 are arranged and/or may be larger than the diameter range in which the inner inlet 7** has its mouth area.

In particular, the process water flowing from the outlet ports 13 frontally towards the die plate 22 can flow over an outer region of the cutting blades 22 or flow towards the die plate 22 in the region of the blades 22 and combine there with the process water flowing outwards from the center of the die plate 2 via the co-rotating flow path 9.

In advantageous further development of the invention, the inlets 6 and 7 can be controlled or regulated with respect to the flow rate and/or the pressure and/or with respect to the temperature of the process water independently of one another and/or coordinated with one another and/or in each case individually, for example by means of suitable flow control devices such as valves, flow dividers or possibly also separate pressure sources such as pumps and/or temperature control devices such as heat exchangers or heating elements or cooling elements, so that for each flow path 9 and 11 the flow rate and/or the flow pressure and/or the flow temperature in the region of the respective inlet 6 and 7 can be set individually in the desired manner.

Regardless of the multiple inlets 6, 7 described, the cutting chamber 4 may have a generally considered helical, three-dimensional contour and/or the cutter head 5 may be positioned eccentrically in the cutting chamber 4 to facilitate the path of the cut pellets into the outlet 8 and to equalize the dwell times of the pellets cut in different sectors at different distances from the outlet 8.

In particular, the cutting chamber 4 with its envelope volume defined around the cutting blades, in which the process water can spread out, so to speak, can become larger when viewed in the direction of rotation of the cutter head towards the outlet. For example, in a sector A of the cutting chamber, which is reached by the cutting blades immediately after passing the outlet, cf., FIG. 4, the envelope volume of the cutting chamber can be minimal around the blades, then progressively increase and become maximum towards the outlet. For example, the envelope volume can increase continuously towards sector B, which is opposite outlet 8, and from there it can increase again continuously to sector C, which is upstream of outlet 8 in the direction of blade rotation, cf., FIG. 4.

In this case, the cutting chamber 4, viewed in the direction of rotation of the blades, can increase in depth T and/or in width S in the manner of a snail shell, in particular starting from the area A, which, viewed in the direction of rotation of the cutter head, lies directly behind the outlet 8, towards the outlet 8. The depth T of the cutting chamber means its extension in the axial direction or in the direction of the cutter head axis of rotation, see FIG. 2. The width S means the gap width between the circumferential wall of the cutting chamber 4 and the envelope contour of the blades of the cutting head 5 or the cutting head 5 itself, depending on how the blades are arranged.

In particular, along its outer circumference and thus adjacent to the cutting blades of the cutter head 5 or adjacent to the outer circumference of the cutter head 5, the cutting chamber 3 can define a tubular volume area that can increase continuously or, if necessary, in steps from sector A of the cutting chamber 5 that the blades reach after passing through outlet 8, toward outlet 8.

This volume tube forms a spatial area which is not directly swept by the blades themselves or which adjoins this area swept by the blades and forms, so to speak, a clearance or escape space into which the process water surrounding the cutter head can escape around the cutter head.

The residence time of the pellets in the cutting chamber 4 can be significantly reduced by means of a "volume tube" around the cutting blades which increases in size towards the outlet 8. In the region of smallest gap dimension or in sector A, which is located immediately after the outlet 8 in the direction of circulation and is narrow around the cutter head 5, the inflowing rinsing process water has little space to spread out, so that higher pressures are generated here and thus higher flow velocities of the process water are achieved. This allows the pellets cut there to be flushed out much faster.

On the other hand, as viewed in the direction of circulation of the cutter head 5, more and more pellets are accumulated between or around the cutting blades as they get closer and closer to the outlet 8, since, on the one hand, the pellets already cut further forward as viewed in the direction of circulation are transported along with them and the freshly cut pellets in sectors lying downstream, so to speak, are added to them.

In sectors B and C which are closer to the outlet 8 when considering the direction of circulation of the cutter head 5, cf., FIG. 4, the cutting chamber 4 around the cutter head 5 becomes more voluminous, so that the process water has more space and/or the pressure of the process water decreases and/or the flow velocity of the process water decreases, so that, considered as a whole, the dwell time of the pellets cut in different sectors of circulation A, B, C is equalized.

In order to prevent multiple or even endless circulation of cut pellets, in an advantageous further development of the invention, a flow guide plate 31 and/or a deflector can be arranged in the cutting chamber 4 in the area of the outlet 8 or slightly downstream thereof, in order to direct pellets flowing with the process water specifically into the outlet and prevent them from circulating several times, cf., FIG. 8.

Such a guide plate and/or a shell- or panel-shaped deflector can extend in particular between the outer contour of the cutter head 5 or the envelope contour of the cutting blades on the one hand and the outlet 8 on the other hand, whereby the guide plate 31 or the deflector can project in particular from a circumferential wall of the cutting chamber 4 adjacent to the envelope contour of the cutter head 5 against its direction of rotation into the cutting chamber 4. the deflector can project in particular from a circumferential wall of the cutting chamber 4 adjacent to the envelope contour of the cutter head 5 counter to its direction of rotation into the cutting chamber 4, cf., FIG. 8, for example projecting from a section of the circumferential wall of the cutting chamber 4 which, viewed in the direction of rotation of the cutter head 5, defines the rear edge contour towards the outlet 8, cf., FIG. 8.

For example, the deflector 31 or the deflector can be curved in an arc and inclined at an acute angle to the envelope contour of the cutter head 5 and project inwards from the root area of the outlet 8 under the blades in the manner in order to "fish off" pellets circulating with the blades or to deflect them towards the outlet 8 and prevent them from circulating several times, i.e., prevent them from turning away from the outlet area again or for the first time into the sector A instead of into the sector A. to the outlet 8 and to prevent them from circulating several times, i.e., to prevent them from turning again or for the first time from the outlet area into the sector A instead of flowing into the outlet 8.

As FIG. 3 shows, the cutting chamber housing 3 can advantageously be of split design and comprise a plurality of housing parts 3*a*, 3*b*, for example two housing halves, which can be moved towards and away from each other to allow the cutting chamber housing 3 to be closed and opened. Advantageously, the cutting chamber housing 3 can be divided into two housing halves, one of which is fixed and the other of which is movable.

In particular, the cutting chamber housing 3 may have an interface or junction 26 between two housing parts 3*a*, 3*b* that extends at least partially in an inclined plane that penetrates the cutting chamber 4 so that when the housing parts 3*a*, 3*b* are moved apart, the cutting chamber 4 is opened.

The interface 26 may in particular extend at least predominantly in an inclined plane, which may be perpendicular to a vertical plane containing the cutter head rotation axis 20 and may be inclined at an acute angle with respect to the cutter head rotation axis 20, in particular such that the interface 26 is arranged closer to the die plate 2 at a lower portion of the cutting chamber housing 3 than at an upper portion of the cutting chamber housing 3, cf., FIG. 3. In particular, the interface 26 may be located at the lower edge of the cutting chamber 4 approximately at the die plate 2 and may be spaced further from the die plate 2 at an upper end portion of the cutting chamber housing 3 than the cutting chamber 4 is thick and/or may extend in the region of the annular distribution chamber 25 located behind the end face of the cutting chamber 4 opposite the die plate 2.

For example, the plane in which most of the interface 26 extends may extend inclined at an angle of 45° to 80° with respect to the cutter head axis of rotation 20.

Advantageously, one of the housing parts 3*a* can be arranged in a fixed position, in particular fixedly connected to the die plate 2, while another housing part 3*b* can be movably mounted and/or can form a movable housing part. In particular, the movable housing part 3*b* can be translationally moved away from and toward the fixed housing part 3*a* along a straight line or, if necessary, along an arcuate path. For example, the movable housing part 3*b* can be moved away from and toward or coupled and uncoupled from the fixed housing part 3*a* parallel to the cutter head rotation axis 20.

The movable housing part 3*b* can in particular form a movable assembly together with the cutter head 5. For example, the cutter head 5 can be rotatably mounted on the movable housing part 3*b*.

The movable assembly comprising the movable housing part 3*b* and the cutter head 5 can in particular be movably mounted on a carriage or another suitable bearing device, whereby the carriage 19 can for example also carry the cutter head drive 16, cf., FIG. 1.

The two housing parts 3*a* and 3*b* can be joined together in a sealing manner, whereby a seal 28 can be provided in the area of the interface 26 and can be seated between the edges of the housing parts at the interface. The seal 28 may, for example, be an annular seal or sealing ring, for example in the form of an elastic sealing ring or O-ring, which is placed between the edges of the housing parts 3*a* and 3*b* which can be moved towards each other.

In order to be able to firmly connect the housing parts 3*a*, 3*b* to one another, a connecting device can advantageously comprise a positive and/or non-positive clamping device 29. Such a clamping device 29 can advantageously comprise several clamps, in particular quick clamps 30, which can be arranged distributed along the interface 27 in order to be able to clamp the two housing parts 3*a*, 3*b* on top of each other. The clamping device 29 can apply a clamping force in the direction of the axis of movement of the movable housing part, for example in the direction of the cutter head axis of rotation 20, clamping the movable housing part 3*b* onto the fixed housing part 3*a*.

Advantageously, the quick-action clamps 30 can have externally energy-actuated clamping actuators, for example in the form of pressure medium cylinders, which can be mounted on one of the housing parts and hooked onto the opposite housing part or held in a form-fitting manner in some other way, so that the clamping force can be applied by actuating the clamping actuator.

The invention claimed is:

1. An underwater pelletizer comprising:
- a die plate having a cutting surface; and
- a cutting chamber housing comprising:
  - a cutting chamber having two or more inlets and one or more outlets;
  - a rotatably drivable cutter head having:
    - one or more cutter head channels therethrough;
    - a cutter head axis of rotation; and
    - a diameter area;
  - the cutter head arranged in the cutting chamber for dividing melt strands output from the die plate into cut pellets;
- flow channels and/or flow chambers for generating different process water streams; and
- one or more annular, fixed distribution chambers;

wherein:
- the cutting chamber is configured to be flushed through by process water that is introduced through at least one of the two or more cutting chamber inlets, and is discharged from the cutting chamber together with the cut pellets via at least one of the one or more cutting chamber outlets;
- the cutting chamber further has a first end face formed/delimited by the die plate, and a second end face opposite the first end face in an axial direction from the cutter head axis of rotation, the second end face formed/delimited by a housing wall of the cutting chamber housing;
- the flow channels and/or the flow chambers are configured to generate at least one co-rotating flow path passing through at least one of the one or more cutter head channels into the cutting chamber, and at least one non-co-rotating flow path which does not co-rotate with the cutter head and which leads from a fixed inlet of the two or more cutting chamber inlets into the cutting chamber, wherein the at least one non-co-rotating flow path and the at least one co-rotating flow path generate different process water streams flowing towards the die plate in the axial direction of the cutter head axis of rotation;
- at least two of the two or more cutting chamber inlets are separate cutting chamber inlets, separate one from the other, for separately feeding the at least one co-rotating flow path and the at least one non-co-rotating flow path into the cutting chamber;
- a first distribution chamber of the one or more annular, fixed distribution chambers is configured to generate the at least one non-co-rotating flow path, the first distribution chamber being adjacent to the second end face of the cutting chamber and behind the housing wall forming/delimiting second end face of the cutting chamber, and the first distribution chamber having at least one outlet port with one or more outlet port openings going through the second end face of the cutting chamber to connect with/be in fluid communication with the cutting chamber; and
- the one or more outlet port openings each have a longitudinal axis and define a direction of flow of the at least one non-co-rotating flow path for feeding the at least one non-co-rotating flow path towards the die plate at an angle ranging from 70° to 110° to the cutting surface of the die plate, and the one or more outlet port openings being arranged radially outside the diameter area of the cutter head so the process water flow along the at least one non-co-rotating flow path hits an annular area of the die plate located radially outside the diameter area of the cutter head.

2. The underwater pelletizer according to claim 1, wherein the at least one non-co-rotating flow path leads onto the die plate outside of the at least one co-rotating flow path and/or is spaced farther from the cutter head axis of rotation than the at least one co-rotating flow path.

3. The underwater pelletizer according to claim 1, wherein the at least one non-co-rotating flow path is led at least approximately parallel to the cutter head axis of rotation and/or substantially perpendicular to an exit face of the die plate onto cutting blades of the cutter head.

4. The underwater pelletizer according to claim 1, wherein the at least one outlet port opens into the cutting chamber in a diameter region larger than an outer diameter of a blade carrier of the cutter head.

5. The underwater pelletizer according to claim 1, wherein the at least one outlet port is spaced farther from the die plate than an outlet port of at least one of the two or more cutting chamber inlets for feeding the at least one co-rotating flow path.

6. The underwater pelletizer according to claim 1, wherein the cutting chamber housing comprises two separate annular, fixed distribution chambers, the first distribution chamber and a second distribution chamber that opens into the cutting chamber via the at least one co-rotating flow path.

7. The underwater pelletizer according to claim 1, wherein the at least one co-rotating flow path opens through at least one of the one or more cutter head channels within cutting blades of the cutter head into a frontal gap between the die plate and the cutter head.

8. The underwater pelletizer according to claim 1, wherein the at least one co-rotating flow path is directed at least approximately parallel to the cutter head axis of rotation and/or axially substantially perpendicular to the die plate.

9. The underwater pelletizer according to claim 1, wherein the at least one co-rotating flow path is directed at an acute angle inclined with respect to the die plate towards the die plate.

10. The underwater pelletizer according to claim 1, wherein the at least two separate cutting chamber inlets each form annular flow channels nested within one another and extending at least approximately parallel to the cutter head axis of rotation.

11. The underwater pelletizer according to claim 1, wherein the at least two separate cutting chamber inlets have discharge openings that open into the cutting chamber, the discharge openings being arranged in annular regions having diameters of different sizes.

12. The underwater pelletizer according to claim 1, wherein the at least one outlet port has a slot-type arc-shaped curved contour and/or forms an annular outlet slot around the cutter head in the second end face of the cutting chamber.

13. The underwater pelletizer according to claim 1, wherein the at least one outlet port comprises a plurality of outlet ports provided with the same or different contouring for feeding the cutting chamber.

14. The underwater pelletizer according to claim 1, wherein at least one of the one or more cutter head channels is arranged along an annular contour around the cutter head axis of rotation and/or are distributed centrically and/or eccentrically with respect to the cutter head axis of rotation and pass through the cutter head from one end face of the cutter head to an opposite end face of the cutter head.

15. The underwater pelletizer according to claim 14, wherein at least one of the one or more cutter head channels is aligned parallel to the cutter head axis of rotation or are aligned at an acute angle to the cutter head axis of rotation outwardly and/or circumferentially inclined.

16. The underwater pelletizer according to claim 1, wherein at least one of the at least two separate cutting chamber inlets has a nozzle-shaped inlet port on an outer circumferential side of the cutting chamber housing, which is arranged tangentially to a circumferential direction and/or inclined at an acute angle to a radial direction such that process water supplied through the nozzle-shaped inlet port flows through one of the one or more annular, fixed distribution chambers connected to a respective one of the at least two separate cutting chamber inlets spirally and/or along a circumferential wall.

17. The underwater pelletizer according to claim 16, wherein the inclination of the nozzle-shaped inlet port is selected such that the process water in the one of the one or more annular, fixed distribution chambers has a direction of circulation corresponding to a direction of rotation of the cutter head.

18. The underwater pelletizer according to claim 1 further comprising:

a fluid control and/or temperature control device for controlling and/or regulating a flow rate and/or pressure and/or temperature of the process water supplied to one of the at least two separate cutting chamber inlets independently of the flow rate and/or pressure and/or temperature of the process water supplied to another one of the at least two separate cutting chamber inlets.

19. The underwater pelletizer according to claim 18, wherein the flow control and/or temperature control device is adapted to control and/or coordinate the process water stream at each of the at least two separate cutting chamber inlets individually with respect to flow rate and/or pressure and/or temperature.

20. The underwater pelletizer according to claim 1, wherein the cutting chamber housing is divided into at least one fixed housing part and at least one movable housing part, the cutting chamber housing and its cutting chamber being openable by moving the movable housing part away from the fixed housing part.

21. The underwater pelletizer according to claim 20, wherein an intersection and/or connection point between the fixed and movable housing parts extends at least predominantly in an oblique plane inclined at an acute angle to the cutter head axis of rotation.

22. The underwater pelletizer according to claim 21, wherein:

the intersection and/or connection point between the movable and fixed housing parts in a bottom portion of the cutting chamber housing is closer to the die plate than to an upper end portion of the cutting chamber housing; and the intersection and/or connection point divides:

the cutting chamber at the die plate at the bottom portion of the cutting chamber housing; and the first distribution chamber for feeding the at least one non-co-rotating flow path at the upper end portion of the cutting chamber housing.

23. The underwater pelletizer according to claim 20, wherein the fixed housing part is fixed to the die plate and the movable housing part together with the cutter head forms a jointly movable assembly.

24. The underwater pelletizer according to claim 20, wherein the one or more cutting chamber outlets are provided on the fixed housing part and the two or more cutting chamber inlets are provided on the movable housing part.

25. The underwater pelletizer according to claim 1, wherein at least one of the one or more cutting chamber outlets is provided at an upper side of the cutting chamber housing and the at least two separate cutting chamber inlets are provided at a lower half of the cutting chamber housing.

26. The underwater pelletizer according to claim 1, wherein the cutting chamber, viewed in a direction of circulation of the cutter head, has a volume increasing towards the one or more cutting chamber outlets, and viewed in a circumferential direction of the cutter head, a gap dimension between an envelope contour of the cutter head and a circumferential wall of the cutting chamber and/or an axial cutting chamber depth increases in a direction of the cutter head axis of rotation towards the one or more cutting chamber outlets.

27. The underwater pelletizer according to claim 26, wherein the gap dimension and/or the axial cutting chamber depth each continuously and steadily, increase toward the one or more cutting chamber outlets and/or are minimum in a sector located immediately behind the one or more cutting chamber outlets as viewed in the direction of circulation of the cutter head and are maximum in a sector located immediately in front of the one or more cutting chamber outlets.

28. The underwater pelletizer according to claim 26, wherein the cutter head is eccentrically displaced with respect to a center of the cutting chamber.

29. The underwater pelletizer according to claim 26 further comprising:

at least one flow guide plate and/or at least one deflector in the cutting chamber for at least limiting multiple circulation of the cut pellets.

30. The underwater pelletizer according to claim 29, wherein at least one of the guide plates and/or deflectors protrudes along an envelope contour of the cutter head and/or is inclined at an acute angle to the envelope contour of the cutter head.

* * * * *